US008553551B2

(12) United States Patent
Spector

(10) Patent No.: US 8,553,551 B2
(45) Date of Patent: Oct. 8, 2013

(54) DYNAMIC BANDWIDTH ALLOCATION FOR UPSTREAM TRANSMISSION IN PASSIVE OPTICAL NETWORKS

(75) Inventor: Oren Spector, Haifa (IL)

(73) Assignee: Oliver Solutions Ltd., Herzliya ( * ) Notice: Subject to any disclaimer, the term of this patent is extended or adjusted under 35 U.S.C. 154(b) by 282 days.

(21) Appl. No.: 13/158,431

(22) Filed: Jun. 12, 2011

(65) Prior Publication Data

US 2012/0315045 A1    Dec. 13, 2012

(51) Int. Cl.
*G01R 31/08* (2006.01)
(52) U.S. Cl.
USPC .............. 370/235; 370/406; 370/907; 398/58
(58) Field of Classification Search
CPC ............... H04L 12/5602; H04L 47/10; H04L 2012/5679; H04L 12/5601; H04Q 11/0478
See application file for complete search history.

(56) References Cited

U.S. PATENT DOCUMENTS

| 2009/0190931 A1* | 7/2009 | Hamano et al. | 398/99 |
| 2009/0213874 A1* | 8/2009 | Levit | 370/468 |
| 2010/0061401 A1* | 3/2010 | Nakahira | 370/468 |

* cited by examiner

*Primary Examiner* — Jung Park
(74) *Attorney, Agent, or Firm* — Soquel Group LLC

(57) ABSTRACT

Methods for dynamic bandwidth allocation among optical networks units for upstream transmission, performed by an optical line terminal of a passive optical network, which compensate for unused guaranteed bandwidth, which compensate for inability to use allocated bandwidth due to lack of data frame fragmentation, and which provide fair bandwidth allocation between mixed high transmission rate and low transmission rate optical network units.

7 Claims, 4 Drawing Sheets

DYNAMIC BANDWIDTH ALLOCATION FOR UPSTREAM TRANSMISSION IN PASSIVE OPTICAL NETWORKS

FIELD OF THE INVENTION

The present invention relates to passive optical networks.

BACKGROUND OF THE INVENTION

A passive optical network (PON) is a point-to-multipoint fiber-optic network, in which unpowered optical splitters are used to enable a single optical fiber to service multiple premises, typically 16-128 homes. Reference is made to FIG. 1, which is a simplified diagram of a prior art PON 100. As seen in FIG. 1, PON 100 includes a central office node, referred to as an optical line terminal (OLT) 140, a number of user nodes, referred to as optical network units (ONUs) 120, which are near user premises 130, and fibers 150 and beam splitters 160 between them. Data is transmitted within PON 100 in packets of data frames. Downstream signals (i.e., signals transmitted from left to right in FIG. 1) originate from network services, such as an Internet service 110A, a voice over IP service 110B, a cable TV service 110C and other such services 110D. The downstream signals are broadcast to all premises 130 that share a single fiber.

PON 100 does not use electrically powered components to split the signal. Instead, the signal is distributed using beam splitters 160. Each splitter 160 typically splits the signal from a single fiber into 16, 32 or 64 fibers, and multiple splitters can be aggregated in a single cabinet. Splitter 160 does not provide switching or buffering capability. The resulting connection is called a "point-to-multipoint link". For such a connection, ONUs 120 must perform some auxiliary functions. For example, because of the lack of switching capability, each signal leaving OLT 140 is broadcast to all ONUs 120 served by splitter 160, including ONUs 120 for which the signal is not intended. ONUs 120 filter out signals intended for other premises 130. In addition, because of the lack of buffering capability, each ONU 120 must be coordinated in a multiplexing scheme to prevent upstream signals (i.e., signals transmitted from right to left in FIG. 1) from colliding at the intersection. Two types of multiplexing are commonly used; namely, wavelength-division multiplexing and time-division multiplexing. With wavelength-division multiplexing, each ONU 120 transmits its signal using a unique wavelength. With time-division multiplexing, ONUs 120 take turns transmitting data.

For upstream signals, OLT 140 is responsible for allocating bandwidth to ONUs 120 in such a way as to provide a respective guaranteed bandwidth to each respective ONU. ONUs 120 may be located at varying distances from OLT 140 and, as such, the transmission delays for different ONUs 120 may be different. OLT 140 measures the transmission delays and sets registers to compensate for delay over all ONUs 120. Once the registers have been set, OLT 140 transmits grants to ONUs 120. A grant is permission to use a defined interval of time for upstream transmission. The grants ensure that each ONU 120 receives timely bandwidth for its service needs.

There are several drawbacks with conventional PONs. One drawback is the inability to compensate for periods of unused guaranteed bandwidth.

Another drawback relates to loss due to lack of data fragmentation. Some PONs, such as Ethernet PONs, lack data frame fragmentation and, as such, data frame sizes vary. ONUs 120 that are allocated bandwidth may not be able to use their allocated bandwidth if it is less than the bandwidth required for transmitting a currently available data frame. Such inability degrades overall performance of PON 100.

Yet another drawback relates to next generation PONs, which will operate at 10 Gbit/s rates in the near future. Current generation PONs operate at 1 Gbit/s rates, and the next generation PONs will include both 1 Gbit/s and 10 Gbit/s ONUs. Conventional bandwidth allocation methods do not take into consideration mixed 1 Gbit/s and 10 Gbit/s PONs.

SUMMARY OF THE DESCRIPTION

Aspects of the present invention relate to methods and systems for efficient bandwidth allocation for passive optical networks. The present invention overcomes drawbacks of conventional PONs, by providing dynamic bandwidth management that compensates for unused guaranteed bandwidth and for loss due to lack of data frame fragmentation, and by providing fair bandwidth allocation between mixed 1 Gbit/s and 10 Gbit/s ONUs.

Aspects of the present invention use a novel application of a Dual Leaky Bucket model, for determining bandwidth allocation. The Dual Leaky Bucket model tracks bandwidth entitlement based on a guaranteed bandwidth rate and a best-effort bandwidth rate, in terms of buckets that leak water at respective leakage rates and are entitled to be supplied with water so that they remain full. The Dual Leaky Bucket model provides an algorithm used by an OLT to efficiently dynamically allocate bandwidth among ONUs so as to ensure excellent and fair overall performance of the PON.

There is thus provided in accordance with an embodiment of the present invention a method for dynamic bandwidth allocation performed by an optical line terminal (OLT) of a passive optical network, including dynamically allocating, by the OLT, amounts of bandwidth to a plurality of entities that require use of bandwidth, tracking, by the OLT, unused bandwidth allocated to the plurality of entities over time, and compensating, by the OLT, bandwidth requests from the plurality of entities based upon their tracked unused bandwidth.

There is additionally provided in accordance with an embodiment of the present invention a method for dynamic bandwidth allocation performed by an optical line terminal (OLT) of a passive optical network, including providing, to the OLT, service level agreement data for a plurality of entities that require use of bandwidth, the service level agreement data comprising, for each entity, a guaranteed rate of bandwidth, and wherein the entities include two groups, the first group of entities being able to utilize bandwidth more effectively than the second group of entities, and determining a prioritization for allocating limited available bandwidth for best-effort among the first and second groups, based on the guaranteed rates of bandwidth.

There is further provided in accordance with an embodiment of the present invention a method for dynamic bandwidth allocation performed by an optical line terminal (OLT) of a passive optical network, including providing, to the OLT, service level agreement (SLA) data for a plurality of entities that require use of bandwidth, the SLA data including, for each entity, a guaranteed rate of bandwidth and a best-effort rate of bandwidth, dynamically receiving, by the OLT, requests for bandwidth from one or more of the entities, dynamically determining, by the OLT, an order of priority of the plurality of entities, and dynamically processing, by the OLT, requests from entities for bandwidth based upon the order of priority and based upon a dual leaky bucket model wherein, for each entity, a first bucket has a capacity and a leak rate based upon the SLA guaranteed rate of bandwidth for the entity, a second bucket has a capacity and a leak rate based upon the SLA best-effort rate of bandwidth for the entity, and the first bucket spills over to the second bucket when its capacity is exceeded.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to efficient bandwidth allocation for PONs, using time-division multiplexing. The bandwidth allocation is required to comply with service level agreements (SLA) corresponding to the respective ONUs.

Figure 1:
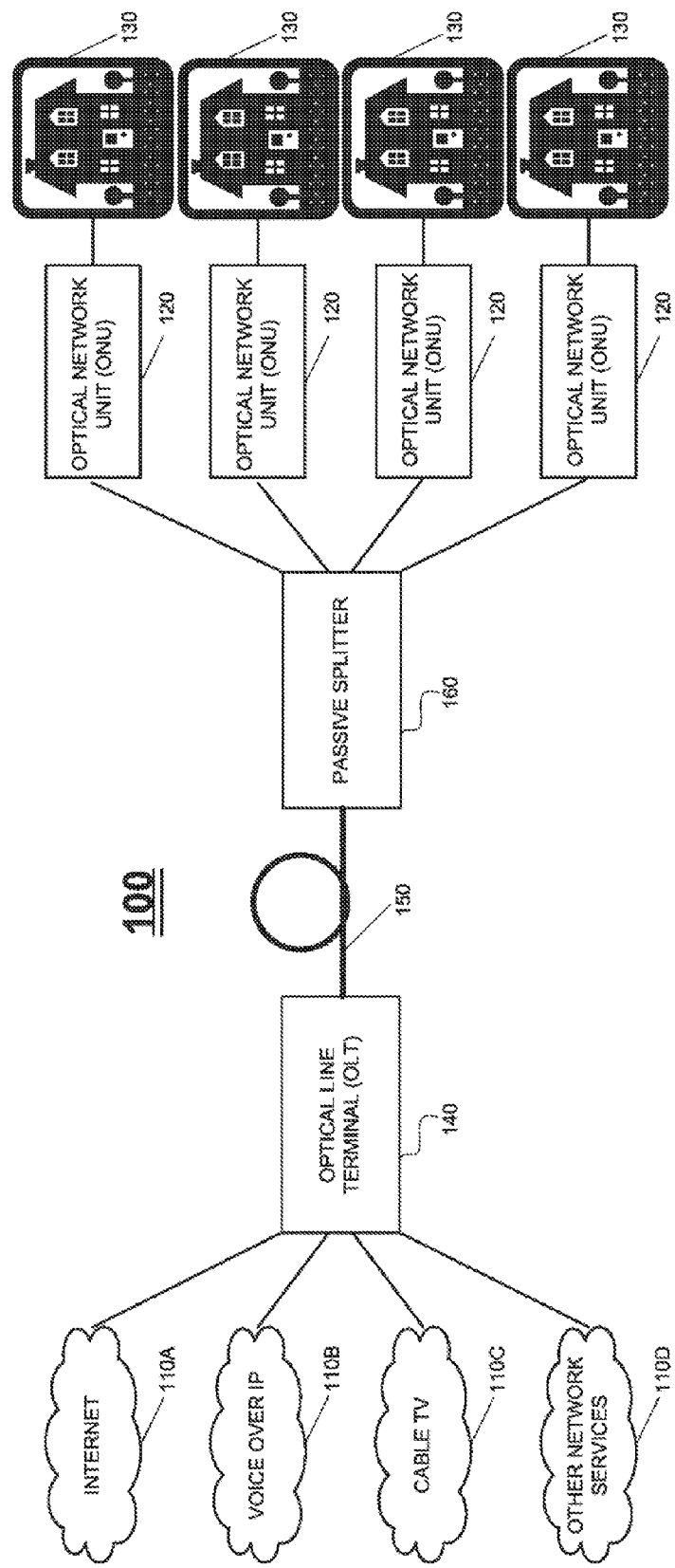
FIG. 1 is a simplified block diagram of a prior art PON.
Figure 2:
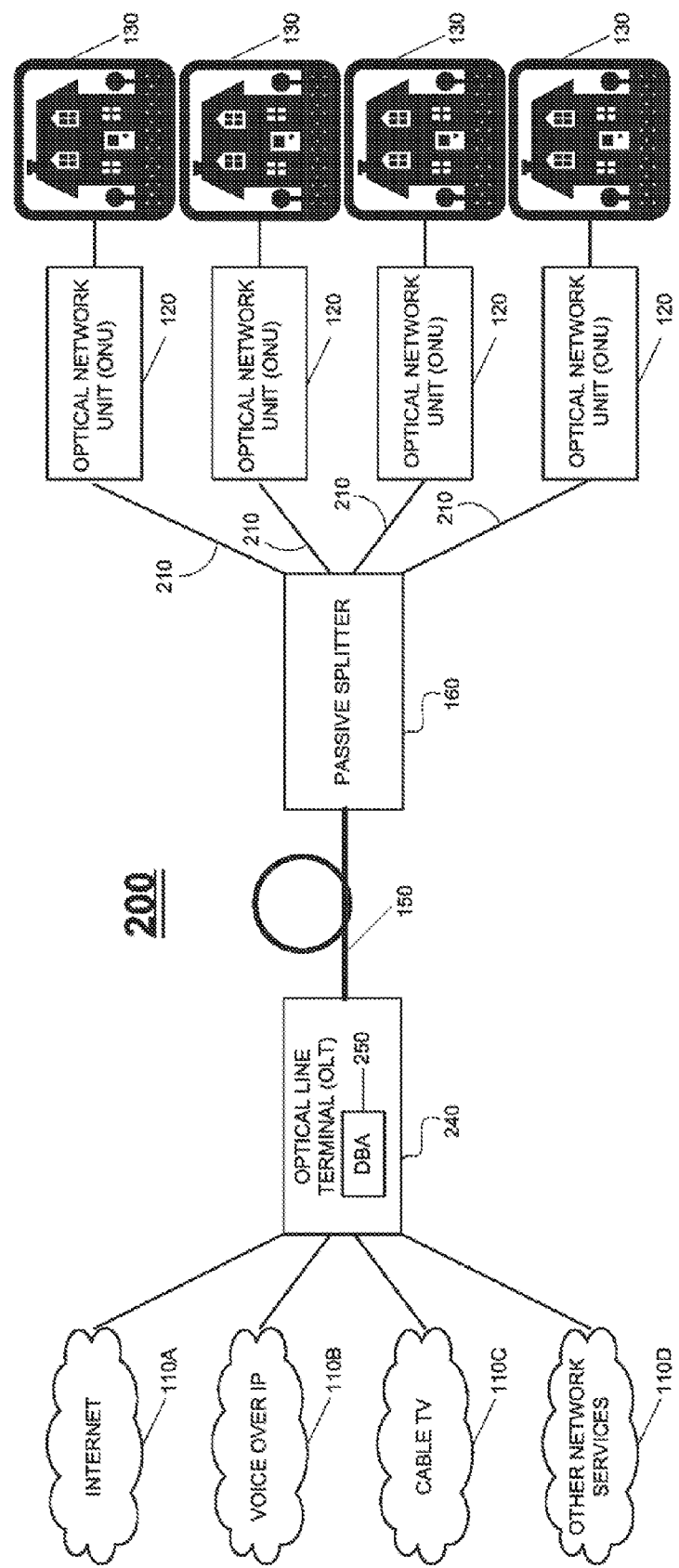
FIG. 2 is a simplified block diagram of an enhanced PON, with dynamic bandwidth allocation in accordance with an embodiment of the present invention.

Reference is made to FIG. 2, which is a simplified block diagram of an enhanced PON 200, with dynamic bandwidth allocation in accordance with an embodiment of the present invention. PON 200 includes an OLT 240 with a novel dynamic bandwidth allocation (DBA) module 250. Operation of DBA module 250 is described in detail hereinbelow.

Conventional PONs operate at 1 Gbit/s rates, but PONs with 10 Gbit/s rates will be available in the near future. The 10 Gbit/s PONs will accommodate both 1 Gbit/s and 10 Gbit/s ONUs 120. I.e., some of the fibers 210 in FIG. 2 will have 1 Gbit/s transmission rates, and others of the fibers 210 will have 10 Gbit/s transmission rates. Systems and methods of the present invention are also of advantage to such a PON, which is a mixed 1 Gbit/s and 10 Gbit/s network.

The subject description relates generally to allocating bandwidth to entities that require use of bandwidth, where an entity includes inter alia an ONU, a logical link identifier, a service and a user. Each entity has an SLA vis-à-vis the PON, which prescribes two relevant parameters; namely, a guaranteed (committed) bandwidth rate, and a best-effort (peak) bandwidth rate. These parameters are specific to each entity. Generally, the PON has sufficient bandwidth to satisfy the guaranteed rates of all of the entities simultaneously, but does not have sufficient bandwidth to satisfy the best-effort rates of all of the entities simultaneously.

In one embodiment, the present invention uses a novel application of a Dual Leaky Bucket algorithm. The conventional Leaky Bucket algorithm is used in computer and telecommunication networks to ensure that data transmissions conform to prescribed limits on bandwidth and "burstiness", which is a measure of variability in traffic flow. The Leaky Bucket algorithm corresponds to a model of a bucket that accumulates amounts of water, but has a hole in the bottom, through which any water it contains leaks out at a constant rate. Water is added intermittently, in bursts. If too much water is added, the capacity of the bucket is exceeded, and the bucket overflows.

Figure 3:
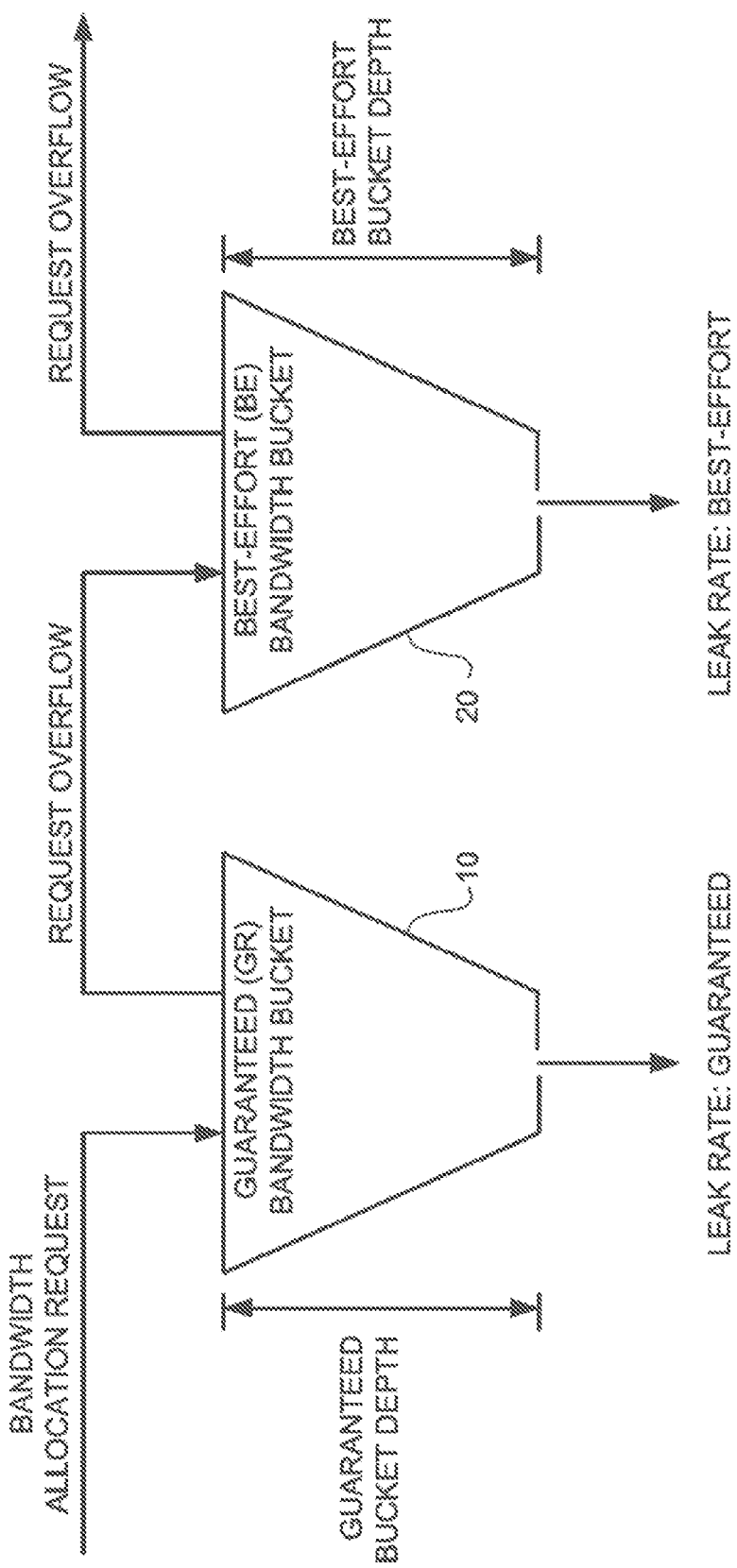
FIG. 3 is a simplified illustration of a Dual Leaky Bucket model underlying a method for efficient time-divisional multiplexing, in accordance with an embodiment of the present invention.

The Dual Leaky Bucket algorithm used by the present invention corresponds to a model of two buckets, the first bucket of which overflows into the second bucket when the capacity of the first bucket is exceeded. Reference is made to FIG. 3, which is a simplified illustration of a Dual Leaky Bucket model underlying a method for efficient time-divisional multiplexing, in accordance with an embodiment of the present invention.

As seen in FIG. 3, the Dual Leaky Bucket model uses two buckets, a first bucket 10, designated GR, for guaranteed bandwidth, and a second bucket 20, designated "BE", for best-effort bandwidth. For application to PONs, each entity that requires use of bandwidth is assigned its own buckets 10 and 20. The capacities of buckets 10 and 20 are set so as to correspond to small multiples of the amount of data arriving at the respective guaranteed bandwidth rate and the best-effort bandwidth rate during a bandwidth allocation cycle. The buckets accumulate amounts of data, and leak at respective rates corresponding to the guaranteed bandwidth rate and the best-effort bandwidth rate in an SLA for the entity. The unused portion of bucket 10 corresponds to the amount of data the entity is entitled to, based on the guaranteed bandwidth rate, and the unused portion of bucket 20 corresponds to the amount of data the entity is entitled to, based on the best-effort bandwidth rate. As such, one of the tasks of OLT 240 is to continually determine the allocations of bandwidth to buckets 10 and 20, for each entity in PON 200.

Figure 4:
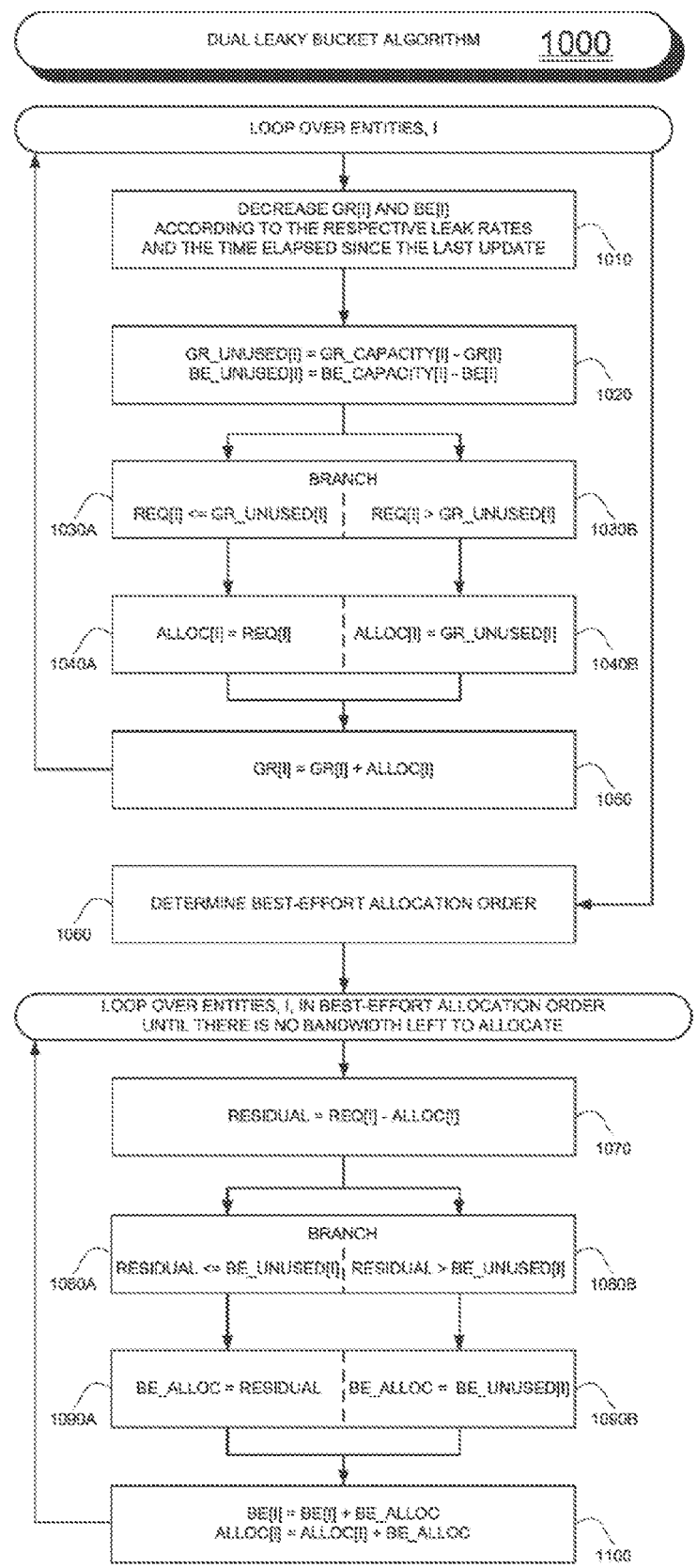
FIG. 4 is a simplified flow chart of a method for efficient time-divisional multiplexing, in accordance with an embodiment of the present invention.

Reference is made to FIG. 4, which is a simplified flow chart of a method 1000 used by DBA module 250 for efficient time-divisional multiplexing, in accordance with an embodiment of the present invention. The method of FIG. 4 involves several variables related to the GR and BE buckets of FIG. 3. Specifically, buckets GR and BE are provided for each entity, I, where I varies from 1 to the total number of entities being serviced by PON 200. In FIG. 2, for example, four ONU entities are being serviced, and I varies from 1 to 4. Denote by GR_CAPACITY[I] and BE_CAPACITY[I] the maximum data capacities of respective buckets GR and BE for entity I. Similarly, denote by GR[I] and BE[I] the current amounts of data in respective buckets GR and BE. At various times, requests for bandwidth are made by various entities, and DBA module 250 must determine how much bandwidth to allocate to the requesting entities. Denote by REQ[I] the amount of bandwidth requested by entity I at a specific time. Initially, when operation of entity I begins, both buckets are full.

The method 1000 proceeds at operation 1010 to update the data amounts GR[I] and BE[i], for an entity I, by decreasing them according to their respective leak rates and according to the time elapsed since their last update. At operation 1020 DBA module 250 determines the unused portions of the GR and BE buckets, GR_UNUSED[I] and BE_UNUSED[I], respectively, by subtracting the updated data amounts from the respective capacities of the buckets. These variables represent the amounts of data entity I is entitled to, based respectively on the guaranteed bandwidth rate and the best-effort bandwidth rate in the entity's SLA.

Operation 1030 is a two-way branch, 1030A/1030B, based on whether REQ[I] is less than or equal to GR_UNUSED[I], or else greater than this amount. DBA module 250 sets bandwidth allocation ALLOC[I] at operations 1040A/1040B according to the respective branch taken at operation 1030. Finally, at operation 1050, DBA module 250 adds the allocation ALLOC[I] to the data GR[I].

DBA module 250 repeats operations 1010-1050 for each entity, I.

At operation 1060 DBA module 250 determines an order for prioritizing the entities, for allocation of leftover bandwidth. The order of prioritization is important because there may not be sufficient bandwidth left over to satisfy all of the entities' requirements. Operation 1060 is described in detail hereinbelow.

At operation 1070 DBA module 250 calculates the unfulfilled portion, RESIDUAL, of the original request REQ[I] by subtracting the allocated bandwidth, ALLOC[I], from the original requested bandwidth REQ[I]. Operation 1080 is a two-way branch, 1080A/1080B, based on whether RESIDUAL is less than or equal to BE_UNUSED[I], or else greater than this amount. DBA module 250 sets best effort bandwidth allocation BE_ALLOCATION at operations 1090A/1090B according to the respective branch taken at operation 1080. Finally, at operation 1100, DBA module 250 adds the allocation BE_ALLOCATION to the data amount BE[I] and to the allocation amount ALLOC[I]. As such, ALLOC[I] now includes both the guaranteed allocation and the best-effort allocation.

DBA module 250 repeats operations 1070-1100 for entities I according to the order determined at operation 1060, until DBA module 250 has allocated all of the available bandwidth.

It will be appreciated by those skilled in the art that method 1000 is able to allocate guaranteed bandwidth at operation 1050 for all entities, since the sum of the GR bucket capacities is less than the total bandwidth that DBA 250 has available to allocate. However, method 1000 may not be able to allocate best-effort bandwidth at operation 1100 for all entities, since the sum of the BE bucket capacities is generally greater than the total bandwidth that DBA 250 has available to allocate. As such, the loop over operations 1070-1100 may terminate before all of the unfulfilled portions of entities' requests have been processed.

Regarding operation 1060, conventional methods for 1 Gbit/s PONs, perform this operation by prioritizing the entities I in ascending order according to the values of the ratios TX[I]/GR[I], where TX[I] is the transmission rate of entity I. I.e., entities with lower ratios TX[I]/GR[I] are favored.

For mixed 1 Gbit/s and 10 Gbit/s PONs, there is a trade-off between the utilization advantage in allocations to 10 Gbit/s ONUs 120, and between overall fairness among all ONUs 120. For such PONs, embodiments of the present invention additionally prioritize allocation of best-effort bandwidth between the group of 1 Gbit/s entities and the group of 10 Gbit/s entities.

In one embodiment, the present invention introduces and uses a tolerance parameter, R, to prioritize allocation of best-effort bandwidth. Specifically, denote by BW1G the total guaranteed bandwidth allocated to the 1 Gbit/s entities, i.e., $$BW1G=\Sigma\{GR[I]: I \text{ is a 1 Gbit/s entity}\}; \quad (1)$$

and similarly denote by BW10G the total guaranteed bandwidth allocated to the 10 Gbit/s entities, i.e., $$BW10G=\Sigma\{GR[I]: I \text{ is a 10 Gbit/s entity}\}. \quad (2)$$

Denote by BWR the ratio of the total guaranteed bandwidth for the 10 Gbit/s entities to the total guaranteed bandwidth for the 1 Gbit/s entities; i.e., $$BWR=BW10G/BW1G. \quad (3)$$

Accordingly to the value of BWR, DBA module 250 prioritizes the best-effort bandwidth allocation as follows.

If BWR>=R, then prioritize the best-effort bandwidth for the 10 Gbit/s entities over the 10 Gbit/s entities; else
if BWR<=1/R, then prioritize the best-effort bandwidth for the 1 Gbit/s entities over the 10 Gbit/s entities; else
if 1/R<BWR<R, then prioritize the best-effort bandwidth for the 1 Gbit/s entities equally with the 10 Gbit/s entities.

The parameter R is a tolerance factor larger than 1, which is calibrated based on the desired sensitivity of PON 200 to fairness between 1 Gbit/s and 10 Gbit/s entities.

In accordance with an embodiment of the present invention, prioritizing 1 Gbit/s entities over 10 Gbit/s entities, or vice versa, may be enforced by scaling the transmission rates TX[I] of the less preferred entities I by an adjustable multiplicative factor, F>1, prior to sorting them in order of ascending ratios TX[I]/GR[I]. E.g., if the BWR ratio of EQ. (3) indicates that the 1G ONUs are to be prioritized over the 10G ONUs, then the transmission rates TX[I] of the 10G ONUs, I, are scaled by multiplying them by the factor F. Thereafter, all of the entities are sorted into priority order according to the ascending ratios TX[I]/GR[I] after scaling of the transmission rates. As such, it will be appreciated that the scale factor F serves to boost the ratios TX[I]/GR[I] of the less preferred ONUs, thereby giving an advantage to the more preferred ONUs.

In another embodiment of the present invention, DBA module 250 further optimizes bandwidth allocation by tracking loss due to lack of data frame fragmentation. If an entity is allocated a bandwidth, the entity may nevertheless not be able to use the allocated bandwidth if the bandwidth allocated is less than the bandwidth needed for the currently available data frame for transmission. Such loss of use degrades the overall performance of PON 200.

In accordance with an embodiment of the present invention, DBA module 250 tracks average unused bandwidth over time, and compensates for it when the average unused bandwidth exceeds a threshold. Specifically, to track average unused bandwidth, a variable LOSS[I,T] is defined by $$LOSS[I,T]=ALLOC[I,T-2]-TRANSMISSION[I,T-1], \quad (4)$$

where T denotes the current time in cycles, ALLOC[I, T−2] is the bandwidth that was allocated to entity I at time T−2, and TRANSMISSION[I,T−1] is the amount of bandwidth that was subsequently used by entity I at time T−1. As such, it will be appreciated that LOSS[I,T] measures unused available bandwidth at time T. By averaging these measures over time, an average unused bandwidth AVG_UNUSED[I,T] is calculated.

According to the value of AVG_USED[I,T], the loss due to data fragmentation is compensated for as follows.

If AVG_UNUSED[I,T]>K, then reduce REQ[I,T] by K The parameter K is a compensation threshold parameter, and REQ[I,T] is the bandwidth requested by entity I at time T. DBA module 250 reduces the bandwidth requested by entity I by K, when the average unused bandwidth for entity I is larger than K. The excess bandwidth gained from this reduction is subsequently allocated to one or more other entities.

It will be appreciated by those skilled in the art that the above compensation ensures that unused bandwidth due to lack of data fragmentation is utilized, thereby increasing overall utilization of PON 200.

The present invention has broad application to dynamic allocation of resources that are shared among users, where each user has a service level agreement that specifies a guaranteed amount of resources and a best-effort amount of resources. The users may use the allocated resources in chunks that do not necessarily consume their full allocation. Such applications include inter alia:

cellular data service bandwidth allocation for customers sharing a cell;
power allocation for battery charging of electric vehicles;
web server, or other network server bandwidth allocation for users downloading data from the server; and green traffic light allocation in signal-controlled intersections.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for dynamic bandwidth allocation performed by an optical line terminal (OLT) of a passive optical network, comprising:
    dynamically allocating, by the OLT, amounts of bandwidth to a plurality of entities that require use of bandwidth;
    tracking, by the OLT, unused bandwidth allocated to the plurality of entities over time; and
    compensating, by the OLT, bandwidth requests from the plurality of entities based upon their tracked unused bandwidth, comprising subtracting a threshold amount of bandwidth from a bandwidth request from an entity, when the entity's average unused bandwidth exceeds the threshold amount.

2. A method for dynamic bandwidth allocation performed by an optical line terminal (OLT) of a passive optical network, comprising:
    providing, to the OLT, service level agreement (SLA) data for a plurality of entities that require use of bandwidth, the service level agreement data comprising, for each entity, an SLA guaranteed rate of bandwidth, and wherein the entities comprise two groups, the first group of entities being able to utilize bandwidth more effectively than the second group of entities; and
    determining a fair prioritization for allocating limited available bandwidth for best-effort among the first and second groups, based on the size of a ratio of total SLA guaranteed bandwidth for the first group of entities divided by total SLA guaranteed bandwidth for the second group of entities.

3. The method of claim 2 wherein the first group of entities is prioritized over the second group of entities if the size of the ratio is greater than an upper threshold size, and wherein the second group of entities is prioritized over the first group of entities if the size of the ratio is less than a lower threshold size.

4. The method of claim 3 comprising:
    for each entity in the second group of entities, scaling the entity's rate of transmission by a factor larger than one, if the size of the ratio is greater than the upper threshold size;
    for each entity in the first group of entities, scaling the entity's rate of transmission by a factor larger than one, if the size of the ratio is less than the lower threshold size; and
    sorting all of the entities into ascending order according to the values of their individual ratios of scaled rates of transmission to guaranteed rates of bandwidth.

5. The method of claim 2 wherein the first group of entities comprises 10 Gbit/s optical network units, and the second group of entities comprises 1 Gbit/s optical network units.

6. A method for dynamic bandwidth allocation performed by an optical line terminal (OLT) of a passive optical network, comprising:
    providing, to the OLT, service level agreement (SLA) data for a plurality of entities that require use of bandwidth, the SLA data comprising, for each entity, a guaranteed rate of bandwidth and a best-effort rate of bandwidth;
    dynamically receiving, by the OLT, requests for bandwidth from one or more of the entities;
    dynamically determining, by the OLT, an order of priority of the plurality of entities; and
    dynamically processing, by the OLT, requests from entities for bandwidth based upon the order of priority and based upon a dual leaky bucket model wherein, for each entity, a first bucket has a capacity and a leak rate based upon the SLA guaranteed rate of bandwidth for the entity, a second bucket has a capacity and a leak rate based upon the SLA best-effort rate of bandwidth for the entity, and the first bucket spills over to the second bucket when its capacity is exceeded, comprising:
        dynamically allocating bandwidths to all entities from which requests are received, according to the entities' accumulated bandwidths based upon the SLA guaranteed rates of bandwidth; and
        dynamically allocating unfulfilled portions of the entities' requests, according to the entities' accumulated bandwidths based upon the SLA best-effort rates of bandwidths, in the entities' order of priority until all available bandwidth has been allocated.

7. The method of claim 6 wherein said dynamically determining an order of priority comprises sorting the entities in ascending order according to their ratios of rate of transmission to guaranteed rate of bandwidth.

* * * * *